(12) United States Patent
Fujikata et al.

(10) Patent No.: US 7,085,220 B2
(45) Date of Patent: Aug. 1, 2006

(54) OPTICAL HEAD AND OPTICAL DEVICE FOR ENHANCING THE INTENSITY OF A TRANSMITTED LIGHT

(75) Inventors: Junichi Fujikata, Tokyo (JP); Hitoshi Yokota, Tokyo (JP); Tsutomu Ishi, Tokyo (JP)

(73) Assignee: NEC Corporation, Tokyo (JP)

( * ) Notice: Subject to any disclaimer, the term of this patent is extended or adjusted under 35 U.S.C. 154(b) by 185 days.

(21) Appl. No.: 10/386,681

(22) Filed: Mar. 13, 2003

(65) Prior Publication Data

US 2003/0185135 A1 Oct. 2, 2003

(30) Foreign Application Priority Data

Mar. 27, 2002 (JP) .............................. 2002-088434

(51) Int. Cl.
*G11B 7/00* (2006.01)
(52) U.S. Cl. ............... 369/118; 369/13.33; 369/112.27; 369/112.28
(58) Field of Classification Search ................ 369/118, 369/112.21, 112.27, 112.28, 13.33
See application file for complete search history.

(56) References Cited

U.S. PATENT DOCUMENTS

| 6,307,827 | B1* | 10/2001 | Nishiwaki ............... 369/112.07 |
| 6,359,852 | B1* | 3/2002 | Ueyanagi .................... 369/118 |
| 6,445,453 | B1* | 9/2002 | Hill ............................ 356/450 |
| 6,614,742 | B1* | 9/2003 | Ueyanagi .................... 369/118 |
| 6,818,907 | B1* | 11/2004 | Stark ........................ 250/492.1 |
| 2001/0006435 | A1* | 7/2001 | Ichihara et al. ................ 360/55 |
| 2002/0001283 | A1* | 1/2002 | Niwa et al. ............ 369/112.27 |
| 2003/0112542 | A1* | 6/2003 | Rettner et al. ................. 360/59 |
| 2004/0131001 | A1* | 7/2004 | Nakada et al. ......... 369/112.27 |

OTHER PUBLICATIONS

T.W. Ebbesen et al., "Extraordinary optical transmission through sub-wavelength hole arrays", Natural, vol. 391, (Feb. 12, 1998), pp. 667-669.

* cited by examiner

*Primary Examiner*—Wayne Young
*Assistant Examiner*—Michael V. Battaglia
(74) *Attorney, Agent, or Firm*—Sughrue Mion, PLLC

(57) ABSTRACT

A optical device including conductive films having a first and second surfaces, one hole, surface specific shapes periodically, and a layer inserted as an intermediate layer between the first and the second surface of conductive films. The intermediate layer has the effect for improving surface roughness of the surface of conductive film. A light incident upon one surface enhances an intensity transmitted though the hole.

20 Claims, 7 Drawing Sheets

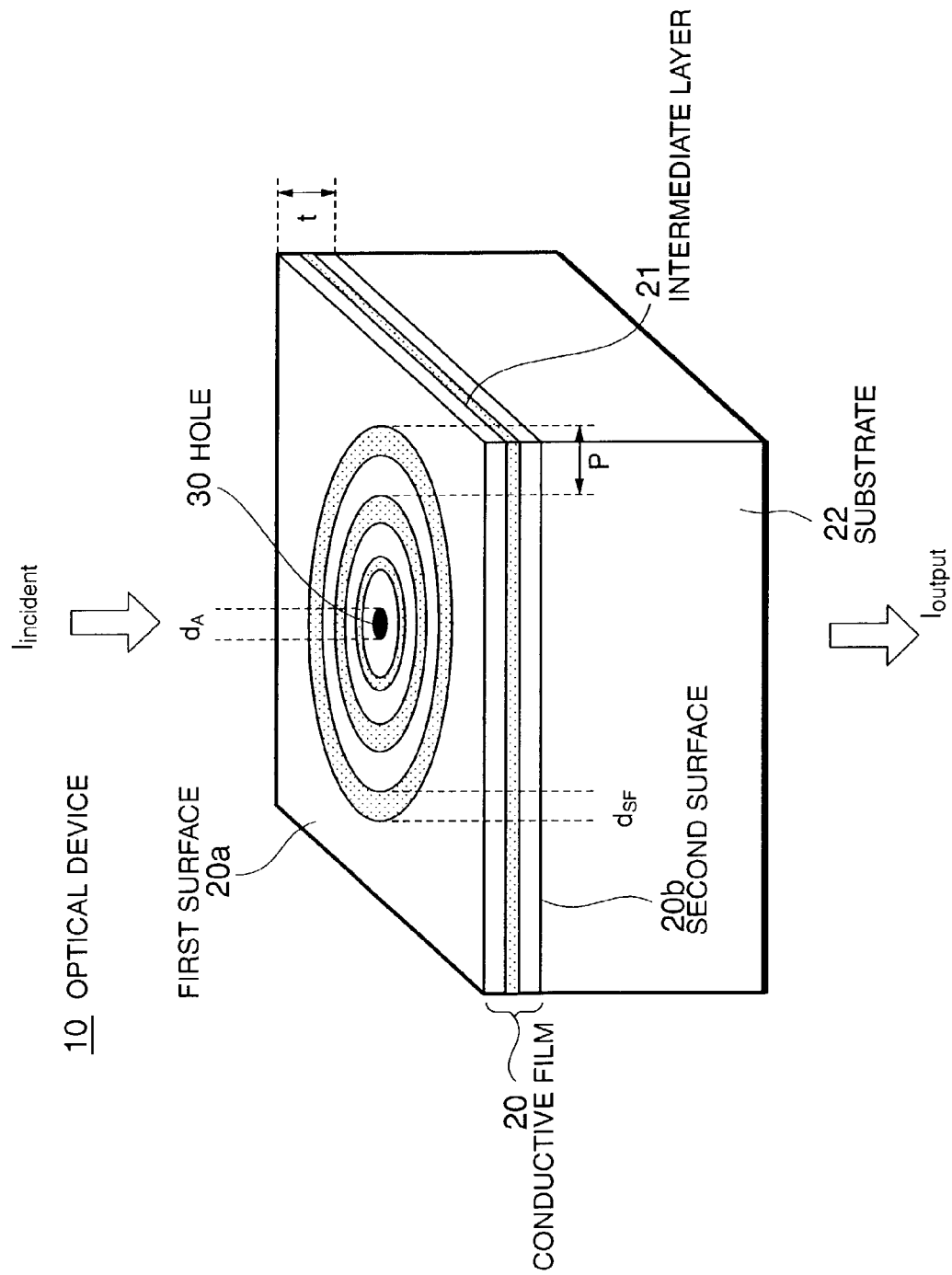

OPTICAL HEAD AND OPTICAL DEVICE FOR ENHANCING THE INTENSITY OF A TRANSMITTED LIGHT

BACKGROUND OF INVENTION

1. Field of the Invention

The present invention relates to an optical device and an optical head using the same. More specifically, the present invention relates to an optical device having a very high throughput and resolution using surface-plasmon-enhanced optical transmission through a sub-wavelength hole in conductive films and a head for an optical recording medium using the same.

2. Description of the Related Art

An optical recording disc such as a CD (compact disc) and DVD (digital video disc) is an increasingly attractive data recording medium because of its high data recording density, compact design, portability, robustness and the lower costs of both the medium and a write device. Irrespective of a relatively high data density provided by the optical disc, a higher recording density is thought to be desirable. A smaller spot provides a higher data recording density on the optical recording medium and a higher data read speed to a given rotating speed of the medium. The recording density is limited by the diffraction limit of an optical spot on the medium. When using a lens or other far field focusing devices to focus the focal point of an optical beam onto the recording medium, the diameter size of a "spot" of the focused light at the focal point is limited to $\lambda/2$ ($\lambda$ is the wavelength of a light.) by diffraction. This is known as the diffraction limit.

To increase the recording density above the current value, the size of the optical beam writing or reading data must be reduced. Such optical disc generally shows significant disadvantages when the read speed (the speed of data which can be read from the optical disc) is relatively low.

As a technique for overcoming the diffraction limit, a near field optical technique using the feature of a low phase speed of an evanescent wave receives attention. The evanescent wave having a short wavelength passing through a sub-wavelength hole holed in a metal film is used for optical write/read.

A flat metal film thicker than its own optical skin depth (the depth in which an electromagnetic field of an incident light is transmitted into a material until a field intensity is lowered to $1/e^2$, typically, 20 to 30 nm to a metal) is nontransparent to a light having a frequency lower than a bulk plasma frequency $\omega p$. The balk plasma frequency $\omega p$ is given by $\omega p = (4\pi n e^2)/m^*$ where n is an electron density, e is an electric charge, and m* is an effective mass. The transmission efficiency of a light passing through a single hole in such metal film depends on the diameter of the hole. When the hole diameter is smaller than the wavelength of a light passing through the hole, the transmissivity is in proportion to $(d/\lambda)^4$.

When using such a small hole, the transmission through the hole in a prior art optical device using a near field, such as a tapered front edge of an optical fiber, is susceptible to severe attenuation. The signal-to-noise ratio is too low for reading and a sufficient optical intensity needed for writing cannot be obtained. A practical optical data read/write head using a near field optical system has not been obtained.

There has recently been disclosed an optical transmission technique which significantly enhances the transmissivity of a light passing through hole arrays using a metal film having light sub-wavelength hole arrays (see T. W. Ebbesen et al., "Extraordinary optical transmission through sub-wavelength hole arrays", Nature, vol. 391, pp. 667–669, (Feb. 12, 1998), U.S. Pat. No. 5,973,316 T. W. Ebbesen et al., filed on Nov. 26, 1997 and provisional U.S. Patent No. 60/051,904, T. W. Ebbesen et al., filed on Jul. 8, 1997).

The transmissivity of a light passing through hole arrays is enhanced when a light incident upon a metal film resonantly interacts with a surface-plasmon mode. The surface plasmon mode (hereinafter called merely plasmon) is an excitation state of collective electrons which exist at the interface between a metal and a dielectric medium adjacent to it. The resonant interaction of the surface plasmon mode and the incident beam is occurred in the structure in which hole arrays are arranged.

In the prior art optical device with hole arrays, the hole arrays are characterized only as a hole transmitting a light. In an application such as write/read of an optical disc, it is desirable that the higher order transmission as shown in the hole arrays be realized by a single hole or a small set of holes. It is also desirable that the transmission of the hole arrays be enhanced. The sub-wavelength hole device showing a sufficient transmission efficiency has not been realized. In the high efficiency optical transmission using the surface plasmon shown by Ebbesen et al., a sufficient optical transmission efficiency has not been obtained yet in the prior art manufacturing method.

As described above, the read/write head for an optical data recording medium of an optical device using a near field optical system is not practical. To solve this, use of a transmitted light enhanced by the plasmon effect is proposed. But, in this case, it is a problem that the efficiency of the transmission light to the incident light is not sufficient.

SUMMARY OF THE INVENTION

A first object of the present invention is to provide an optical device having a high efficiency of the transmission light to the incident light. And a first aspect of the present invention is an optical device including conductive films having first and second surfaces, at least one hole perforated from said first surface to said second surface, and surface specific shapes periodically provided on at least one of the first and second surfaces in which a light incident upon the one surface enhances an intensity transmitted through the hole, wherein the conductive films are of a multilayered structure having an intermediate layer between said first and second surfaces. In the present invention, the multilayered structure may be comprised of single conductive film and the intermediate layer. In this case, the intermediate layer is preferably made of a conductive material.

Another other object of the present invention is to provide an optical read/write head which can read and write at a scale below the wavelength on an optical disc. In the results, it is obtained a line data density much higher than that enabled by a diffraction limit. Then another aspect of the present invention is a head for an optical recording medium which at least writes information on an optical recording medium by a light from a light source, comprising the optical device according to the type above mentioned, waveguide means guiding a light from said light source, and means focusing the light of the waveguide means onto the optical device. And the hole of the optical device is disposed proximately to the optical recording medium.

BRIEF DESCRIPTION OF THE DRAWINGS

FIG. 1 is a view of the optical device of the present invention.

DETAILED DESCRIPTION OF THE INVENTION

Figure 2A:
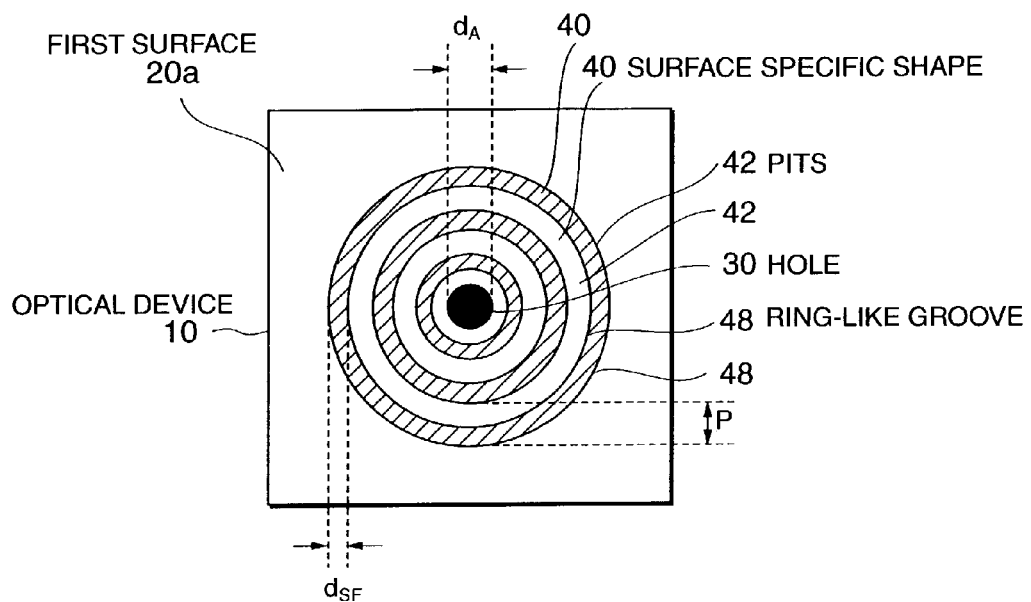
FIG. 2(A) is a view showing the first surface of an example of the present invention.

Preferred embodiments of the present invention will be discussed in detail with reference to the drawings.

Before explaining the specific embodiments of the present invention, some conditions will be described to understand the present invention.

The material forming a layer having a first surface of a conductive film and a layer having a second surface thereof is a conductive material such as all metals and a doped semiconductor. Aluminum, silver, gold or chrome is preferable.

The surface refers to an almost flat surface and all surfaces including surface shapes showing regions swelled or depressed periodically unlike the same. The regions of the surface shapes are arrayed in a periodic or regular repetitive pattern (for example, a regular two-dimensional lattice).

A hole passes through all thicknesses of the conductive films. The conductive film is nominally flat except for the hole. To identify projections and pits, the projections and pits of the surface which are not a hole because they do not pass through all thicknesses of the conductive films will be described using the term, surface specific shape. The surface specific shape can be formed into any desired shape. The intention of the present invention is not limited to any specific size of the surface specific shape. The width of the surface specific shape, that is, a size $d_{SF}$ of the surface specific shape in the periodic direction is made smaller than a period P of the surface specific shape. It is preferable that a value obtained by multiplying the period P of the surface specific shape by a refraction factor nd of the medium adjacent to the conductive films is made smaller (optimally, slightly smaller) than a maximum wavelength $\lambda$ of a light transmitted through the conductive films. The preferable relation between $d_{SF}$, P, $n_d$ and $\lambda$ is $d_{SF}<P$ and $n_d P<\lambda$. The above relation does not limit the present invention. When two different media are adjacent to two surfaces of the conductive films, $n_d$ is preferably equal to one of the two media having a smaller refraction factor.

Referring to the drawings, FIG. 1 is diagram showing one exemplary embodiment of an optical device 10 of the present invention.

Referring to FIG. 1, the optical device 10 of the present invention is basically of a multilayered structure having thin conductive films 20 including a first surface 20a and a second surface 20b and inserting, an intermediate layer 21. It may be a conductive material, an insulating material or a semiconductor material as the intermediate layer.

Specifically, the material which is easily amorphous or a crystallite at stacking is a CoZr alloy, Ta, Cr, Ti, Zr, Nb, C, $Si_3N_4$, $SiO_2$, $Al_2O_3$, $Ta_2O_5$, NiO, $TiO_2$, $ZrO_2$, $NbO_3$, Si or Ge.

The intermediate layer 21 can be reducing the surface roughness of the surface part other than the surface specific shape in the first and second conductive films. And it will be able to provide a high efficiency of the transmission light to the incident light. The reason is that we have found for the first time it is important to reduce the surface roughness existing at random in the surface part other than the periodic surface specific shapes in conductive film.

To improve reduction in optical transmissivity, it is important that the transmission loss of the surface plasmon on the surface of the conductive film be reduced. As a main cause of the transmission loss, the surface plasmon is thought to be scattered by the surface roughness existing at random. Reducing the surface roughness of the surface part other than at the periodic surface specific shapes is thought to be most effective for improving the utilization efficiency of a light.

According to our study, we found that the loss of the light power due to scattering is significant, when such surface roughness scattering the surface plasmon exceeds $\frac{1}{10}$ of a predetermined incident wavelength. To improve the light transmissivity, the surface roughness of the part except for the periodic surface specific shapes must be below about $\frac{1}{10}$ of the predetermined incident wavelength.

It is effective to insert an intermediate layer between the conductive films forming first and second surfaces to reduce the surface roughness of the part other than the periodic surface specific shapes. The intermediate layer is preferably anything which has the effect of improving the surface roughness when being stacked for film deposition.

It is not limited to a plurality of conductive films. The surface roughness of the part other than the periodic surface specific shapes of a single conductive film can be reduced by introducing the intermediate layer or the method described below for smoothing of the conductive film.

Some reasons that the surface roughness is reduced by inserting such intermediate layer are as follows. For example, one is that the thickness of the conductive films forming the first and second surfaces can be designed to be substantially small. The principle of the optical transmission in the present invention is based on interaction of the surface plasmon mode produced on the surface of the conductive film with an incident light. If the conductive material having a relatively small optical loss in transmission of the surface, plasmon exists on the first and second surfaces. So the material inserted there between may have a relatively large optical loss. The thinness of the conductive films is reduced to make the crystal size in the conductive films small. The surface roughness can thus be improved. Secondly, as such intermediate layer material, a material which improves wettability of the conductive film, which has a wettability similar to the conductive film, is applied. Not only the surface roughness of the conductive film but also the optical characteristic (optical loss) can be further improved.

Another way to improve surface roughness of the conductive film, is to optimize the producing method of the conductive film. For example, a sputtering method, particularly, an ion beam sputtering method, can reduce the wettability of the substrate on the conductive film. And in this way, without the intermediate layer, it can make the surface roughness small, below about 1/10 of the predetermined incident wavelength.

Figure 2B:
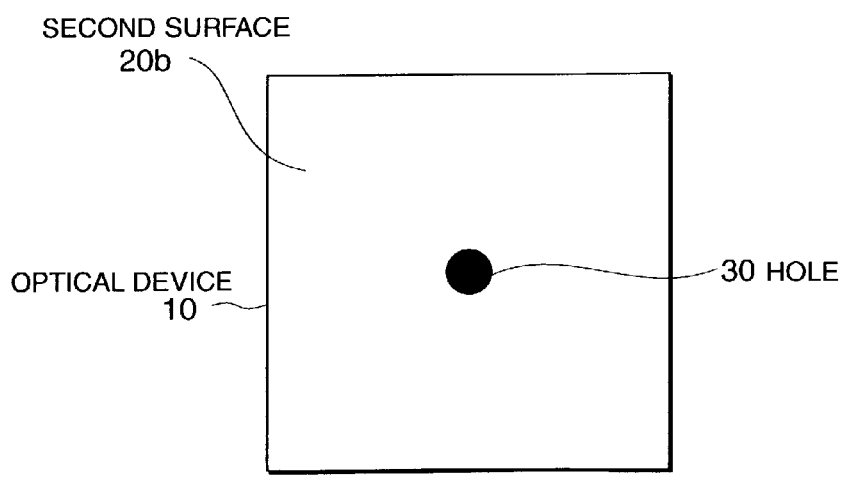
FIG. 2(B) is a view showing the second surface of an example of the present invention.

FIG. 2(A) shows the first surface 20a and FIG. 2(B) shows the second surface 20b. As shown in FIG. 2(A), the first surface 20a includes the hole 30 and concentric surface specific shapes 40 of pits 42. Ring-like grooves 48 have the period P. As FIG. 2(B) shows the second surface 20b, in this embodiment, the periodic surface specific shapes are formed on at least one of the first and second surfaces. The conductive films 20 have at least one hole, that is, a hole 30. At least one of the surfaces 20a, 20b of the conductive films 20 includes periodic surface specific shapes described below. The hole 30 is provided through the stacked three layers, that is, the first and second surfaces and the intermediate layer 21.

The periodic surface specific shapes include surface specific shapes such as projections and pits periodically arranged on the surface of the conductive film. The periodic surface specific shapes can intensively combine the conductive surface plasmon mode with an incident light. The hole of the conductive films conducts intensive transmission of a light wavelength according to a wave number conservation law depending on the period of the periodic surface specific shapes. The degree of the intensive optical transmission is much larger than that of transmission through the same size and number of holes in the case of no periodic surface specific shapes. These are caused by the significant contribution of the surface plasmon of the conductive film. Insertion of the intermediate layer material of the present invention can significantly increase the transmission efficiency.

When the sub-wavelength hole is only a geometric hole, the transmission efficiency (obtained by dividing the transmitted intensity (energy intensity) by the optical intensity incident upon the hole) is very small (For example, when the ratio of the hole diameter to the wavelength is 0.1, it is about $2 \times 10^{-3}$.) In the present invention, the transmission efficiency is largely increased as shown below and the resulting device can control the light transmission characteristic by adjusting the periodicity and regularity of the periodic surface specific shapes.

An incident light is showed as an intensity $I_{incident}$ marked by the arrow in the upper part of FIG. 1. And an output light is showed as an intensity $I_{output}$ marked by the arrow in the lower part of FIG. 1. The $I_{incident}$ moves to the first surface 20a of the conductive film 20 and is transmitted the $I_{output}$ through with high efficiency the hole 30 in the second surface 20b of the conductive film 20.

The transmission intensity is also increased when the light passes through this structure to move in the opposite direction, that is, the light is incident upon the second surface 20b. It should be noted that the transmission intensity from the first surface having the periodic surface shapes is increased.

In the present invention, the intensive transmission of the periodic surface shapes is increased more significantly by the above structure into which the intermediate layer is inserted.

As shown in FIG. 1, the diameter of the hole 30 is expressed by $d_A$. It is desirable that the diameter of the hole 30 be smaller than the wavelength of the incident light incident upon the hole 30. It is to obtain the highest resolution by maximizing the transmission intensity. Preferably, the hole has a diameter less than the wavelength.

The thickness of the conductive films 20 is expressed by t. The conductive films must be sufficiently thick so as to be optically nontransparent. It must be larger than the skin depth of the incident light.

In the embodiment shown in FIG. 1, the conductive film 20 is adjacent or fixed to the support structure (substrate 22). In the present invention, the thin conductive films 20 may be stacked onto glass or quartz to fix the same to the substrate. For example, a silver film having a thickness of 200 nm, a CoZrTa film as an intermediate layer and the silver film may be stacked on a fused quartz or a glass substrate by a sputtering method.

When using the substrate, the periodic surface may be provided on an exposed surface or a surface at the interface of the conductive film-substrate.

When providing the periodic surface shapes on the conductive surface at the interface of the conductive film-substrate, a negative of a pattern is made on the substrate surface to be able to stack the conductive films on the substrate formed with the negative pattern. The surface specific shapes can be provided on the conductive film.

The hole 30 of the embodiment shown in FIGS. 1 or 2 is a circular or cylindrical. Without deviating from the scope of the present invention, these specific shapes may be of other shapes, for example, an elliptic, rectangular, or slit shape.

Figure 3A:
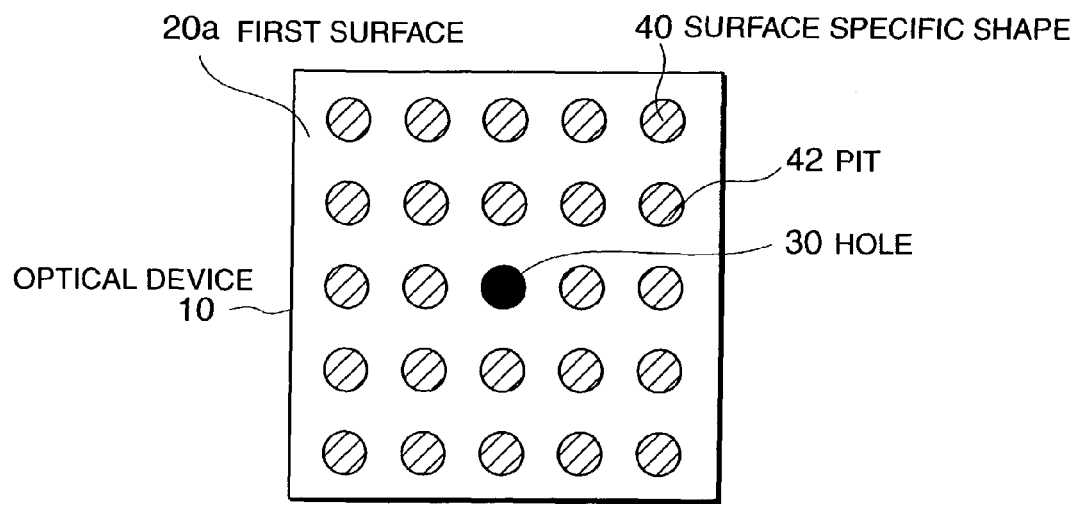
FIG. 3(A) is a view showing the first surface of an example of the present invention.
Figure 3B:
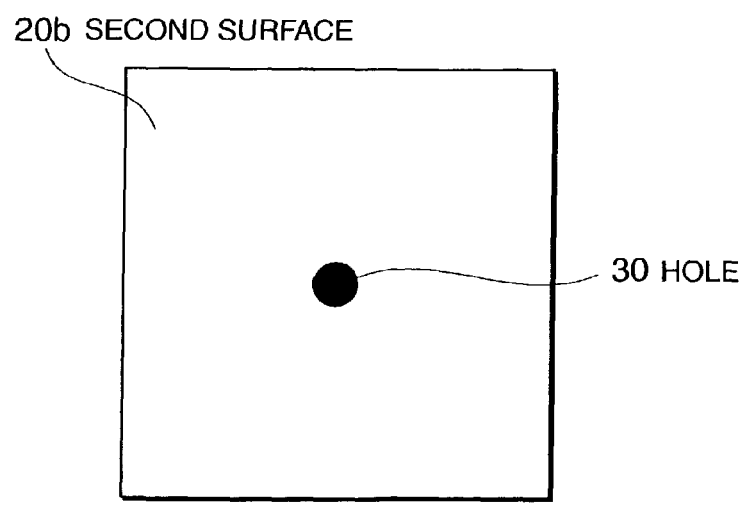
FIG. 3(B) is a view showing the second surface of an example of the present invention.
Figure 4A:
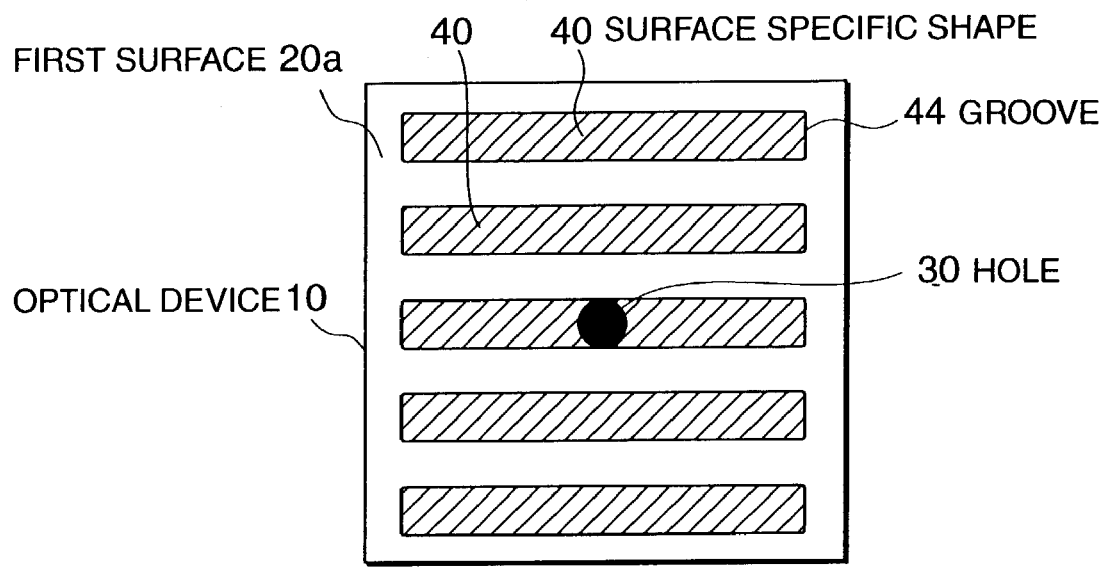
FIG. 4(A) is a view showing the first surface of an example of the present invention.
Figure 4B:
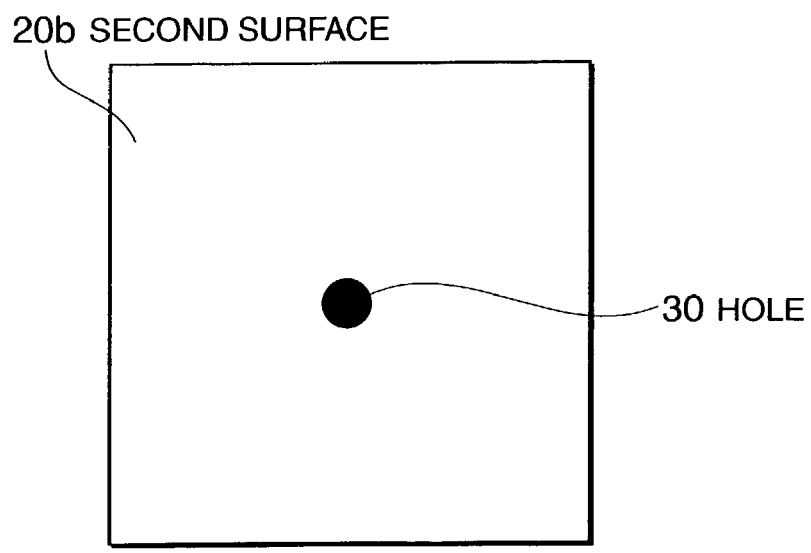
FIG. 4(B) is a view showing the second surface of an example of the present invention.
Figure 5A:
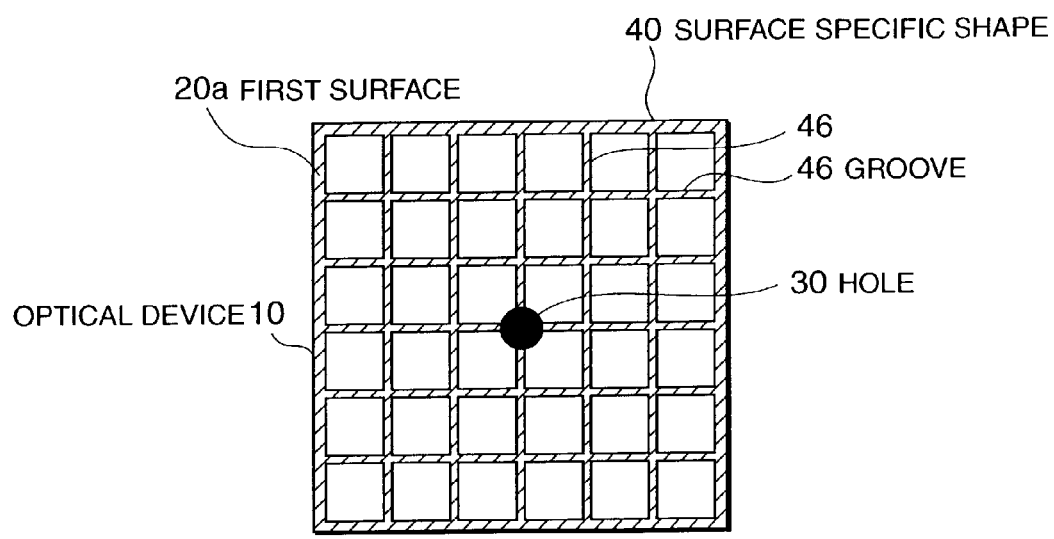
FIG. 5(A) is a view showing the first surface of an example of the present invention.
Figure 5B:
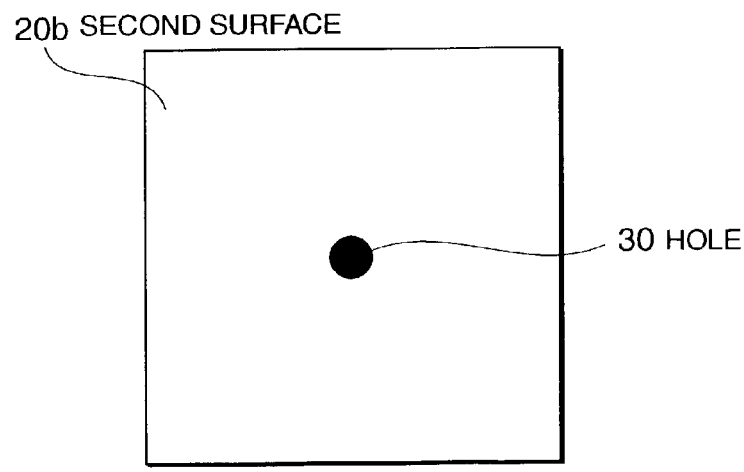
FIG. 5(B) is a view showing the second surface of a example of the present invention.

As described above, actually, the surface specific shapes 40 can include pits or projections of any size or shape in the corresponding surface as long as the width $d_{SF}$ of the surface specific shapes is smaller than the period P of the surface specific shapes. FIG. 3 shows an embodiment of periodic arrays when the surface specific shapes are pits. FIG. 4 shows an embodiment of one-dimensional periodic arrays when the surface specific shapes are grooves. FIG. 5 shows an embodiment of two-dimensional periodic arrays when the surface specific shapes are grooves.

Figure 6:
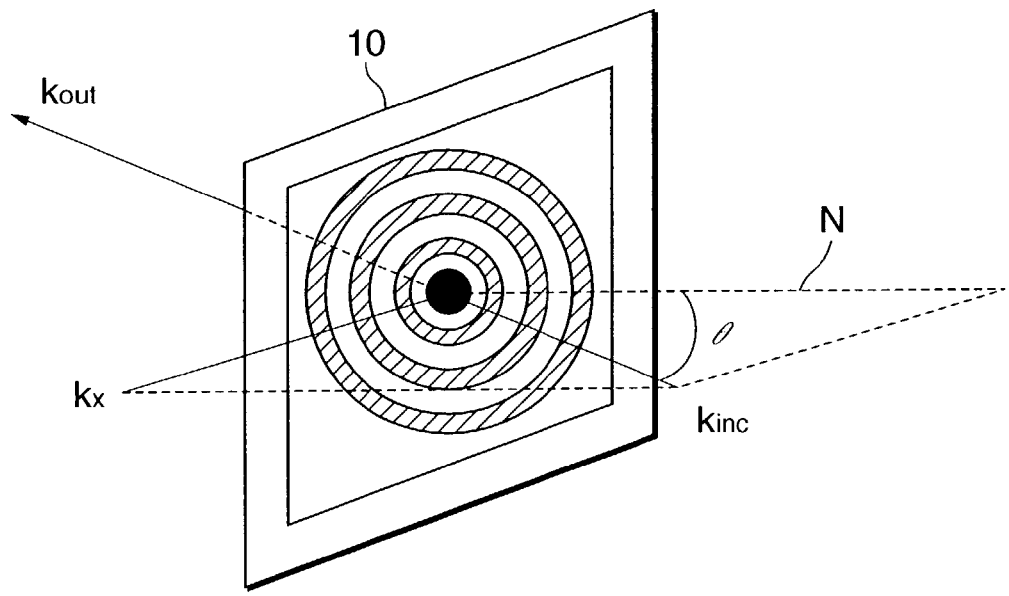
FIG. 6 is a diagram showing the related arrangement of the incident and emitted beams.

FIG. 6 is a diagram showing the combination state of the related arrangement of incident and emitted beams and its surface plasmon in the embodiment of concentric periodic arrays when the surface specific shapes in the conductive film are pits, of the optical device according to the present invention. The optical device 10 made according to the present invention is shown with an incident beam wavelength vector $k_{inc}$ and an emitted beam wavelength vector $k_{out}$. The wavelength vector $k_{inc}$ is incident upon the optical device 10 at an angle θ to normal N to the surface of the, optical device 10. The wavelength vector $k_{out}$ is in parallel with the incident beam wavelength vector $k_{inc}$. A wavelength vector $k_x$ is an x direction component of the wavelength vector $k_{inc}$ in the plane of the surface of the optical device 10.

When the incident light is deflected, and the electric field of the incident is in parallel with the x axis and the conductive film unit is rotated at the angle θ about the y axis, the combination of the surface plasmon on the conductive film having periodic structures with the incident light follows a momentum conservation law shown below:

$$k_{sp} = k_x + iG \qquad (1)$$

where $k_{sp}$ is a surface plasmon vector, $k_x = x(2\pi/\lambda)\sin\theta$ is a wavelength vector component of the incident beam $k_{inc}$ in the plane of the conductive film shown in FIG. 6, and G is a reverse lattice vector $G=(2\pi/P)$ of the periodic lattice of the surface structure where P is a period of the surface specific shape. θ is an angle between the normal N of the surface of the conductive film of the incident wavelength vector $k_{inc}$ as shown in the drawing. The magnitude of the vector $k_{sp}$ is obtained from the following plasmon distribution relation equation:

$$|k_{sp}|=(\omega/c)(\epsilon m \epsilon d/(\epsilon m+\epsilon d))^{1/2} \quad (2)$$

where ω is an angular frequency of the incident beam and ϵm and ϵd are dielectric constants of the conductive film and substrate. It is assumed that ϵm<0 and |ϵm|>ϵd. This is the case for a metal below a bulk plasmon energy and the doped semiconductor.

When the beam is incident perpendicularly (that is, θ=0) upon the conductive film, a peak wavelength is obtained from the following equation (3) combining the equations (1) with (2):

$$\lambda = P(\epsilon m \epsilon d/(\epsilon m+\epsilon d))^{1/2} \quad (3)$$

To analyze the operation of the optical device of the present invention, a zero-order transmission spectrum is recorded as described below. A far field microscope is used to obtain a single spectrum. The spectrum is detected by a CCD (charge-coupled device) camera or a photomultiplier cooled by liquid nitrogen or a Peltier device.

Figure 7:
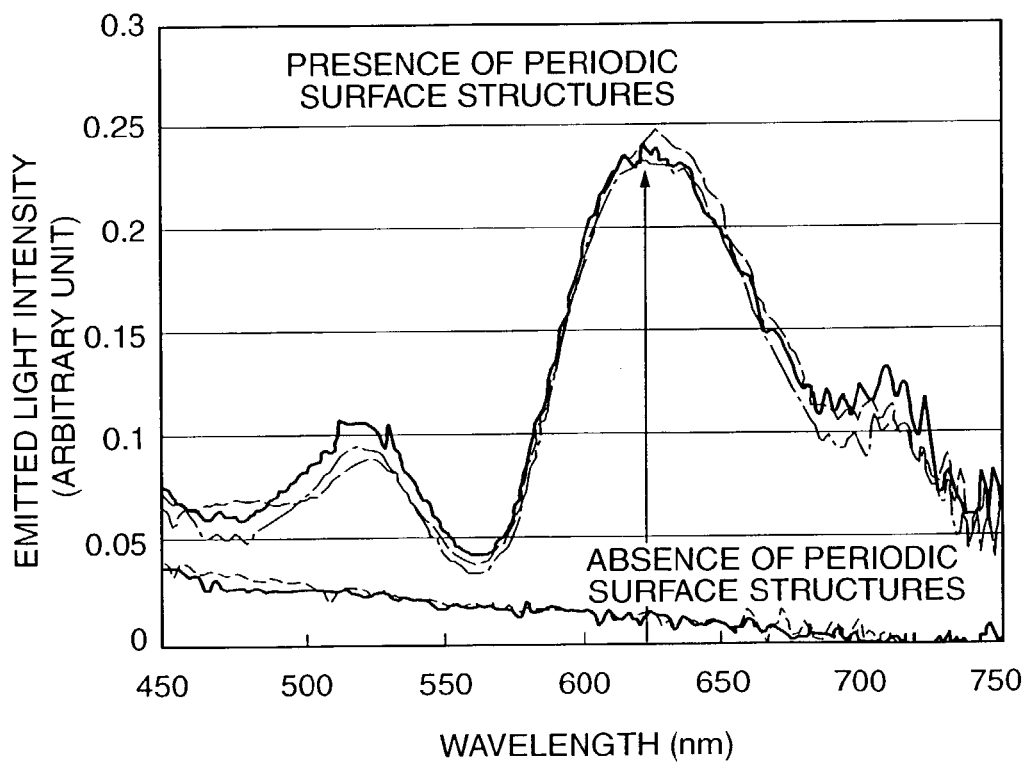
FIG. 7 is a graph showing the emitted light intensity of a example of the present invention.

FIG. 7 shows a typical zero-order transmission spectrum of the present invention. It is data when the period of the periodic surface specific shapes is 600 nm and the hole diameter is 150 nm. The conductive films are of a structure into which CoZrTa is inserted as an intermediate layer (Ag (50 nm)/CoZrTa (200 nm)/Ag (50 nm)). As a reference, an optical transmission spectrum without the periodic surface shapes is also shown. In this structure, a transmission peak is observed around 620 nm as the wavelength position caused by an increase in optical transmission efficiency by the surface plasmon. The transmission efficiency is found to be increased significantly. The enhancement factor of the transmission efficiency is about 30 to 50 times. As described above, the conductive films having the periodic surface roughness and hole show an intensively enhanced transmission efficiency having a clear peak. The peak of the transmission spectra is produced by the resonant interaction of the incident beam with the surface plasmon on both the surfaces 20a and 20b of the conductive films.

A method of manufacturing samples according to the present invention is shown. The samples are formed on a quartz substrate by the following procedure.

A substrate is put in a focused ion beam (FIB) apparatus to conduct evacuation below $1 \times 10^{-7}$ Torr. The beam aperture diameter of the FIB is minimized to form concentric groove structures having a 500 to 600 nm period on the substrate. The depth of the grooves is about 150 to 300 nm. The substrate is taken out from the FIB apparatus to be set to a film deposition apparatus. After conducting evacuation below $10^{-7}$ Torr, the substrate temperature is maintained at the room temperature to a liquid nitrogen temperature. A conductive material, an intermediate layer material and a conductive material are stacked to be deposited. At this time, a suitable protective film stacked on the conductive material may also be deposited. The sample is taken out from the deposition apparatus to be put in the FIB apparatus. The beam aperture diameter of the FIB is minimized to a micro hole having a hole diameter of 50–200 nm in the periodic concentric center part.

The structures of the manufactured samples a. to r. will be shown below. For comparison, the sample whose conductive film is of an Ag single layer is manufactured.

Concentric grooves are manufactured as periodic surface specific shapes. The period is 600 nm, the groove depth is 200 nm and the groove width is 300 nm. A hole having a hole diameter of 50 nm is made in its center part.
a. quartz substrate/Ag (100 nm)/CoZrX (100 nm)/Ag (100 nm) (X=Nb, Ta, Cr or Mo)
b. quartz substrate/Ag (100 nm)/Ta (100 nm)/Ag (100 nm)
c. quartz substrate/Ag (100 nm)/Cr (100 nm)/Ag (100 nm)
d. quartz substrate/Ag (100 nm)/Ti (100 nm)/Ag (100 nm)
e. quartz substrate/Ag (100 nm)/Zr (100 nm)/Ag (100 nm)
f. quartz substrate/Ag (100 nm)/Nb (100 nm)/Ag (100 nm)
g. quartz substrate/Ag (100 nm)/C (100 nm)/Ag (100 nm)
h. quartz substrate/Ag (100 nm)/$Si_3N_4$ (100 nm)/Ag (100 nm)
i. quartz substrate/Ag (100 nm)/$SiO_2$ (100 nm)/Ag (100 nm)
j. quartz substrate/Ag (100 nm)/$Al_2O_3$ (100 nm)/Ag (100 nm)
k. quartz substrate/Ag (100 nm)/$Ta_2O_5$ (100 nm)/Ag (100 nm)
l. quartz substrate Ag (100 nm)/NiO (100 nm)/Ag (100 nm)
m. quartz substrate/Ag (100 nm)/$TiO_2$ (100 nm)/Ag (100 nm)
n. quartz substrate/Ag (100 nm)/$ZrO_2$ (100 nm)/Ag (100 nm)
o. quartz substrate/Ag (100 nm)/$NbO_3$ (100 nm)/Ag (100 nm)
p. quartz substrate/Ag (100 nm)/Si (100 nm)/Ag (100 nm)
q. quartz substrate/Ag (100 nm)/Ge (100 nm)/Ag (100 nm)
r. quartz substrate/Ag (300 nm)

Table 1 shows values in which the sizes of the surface roughness of the surface part other than the periodic surface specific shapes. The surface roughness is expressed by averages and enhancement factors of light transmission efficiency in the respective layer structures.

TABLE 1

| | Surface roughness (nm) | Enhancement factor of light transmission efficiency |
|---|---|---|
| a | 1.5 | 180 |
| b | 2.2 | 100 |
| c | 2.5 | 78 |
| d | 2.4 | 70 |
| e | 3.6 | 42 |
| f | 4.3 | 11 |
| g | 1.1 | 340 |
| h | 1.4 | 210 |
| i | 1.2 | 270 |
| j | 1.4 | 203 |
| k | 1.3 | 224 |
| l | 1.7 | 153 |
| m | 1.9 | 140 |
| n | 2.4 | 64 |
| o | 3.5 | 34 |
| p | 1.9 | 134 |
| q | 1.7 | 160 |
| r | 4.6 | 10 |

The enhancement factor of light transmission efficiency is calculated by the following equation:

enhancement factor of light transmission efficiency=
(light intensity emitted from the hole of the sample having the periodic surface shapes)/
(light intensity emitted from the hole of the sample without the periodic surface shapes)

The roughness of the surface part other than the periodic surface specific shapes can be reduced by selecting an intermediate layer material inserted between the conductive films forming the first and second surfaces. This depends largely on wettability when stacking the conductive films and the intermediate layer. It is preferable that the material is selected in consideration of the surface energy value of the structure material. The above intermediate layer material is stacked or alloyed to obtain the same effect.

When using such stacked structure, the film thickness structure must be decided in consideration of the optical skin depth to the incident light having a predetermined wavelength. The energy region of the surface plasmon can be estimated by referring to the optical skin depth. When using conductive films having a film thickness smaller than the length, the light is transmitted in the part other than the hole. The sub-wavelength emitted light as the object of the present invention cannot be obtained.

As shown in the Table 1, when the surface roughness of the surface part other than the periodic surface specific shapes is below 2.2 nm, the transmission efficiency is realized by three digits. In this embodiment, the transmission efficiency is maximum around 620 nm. The surface roughness is reduced to a value below about 1/300 of the wavelength. The drastic increase in transmission efficiency is observed.

Figure 8:
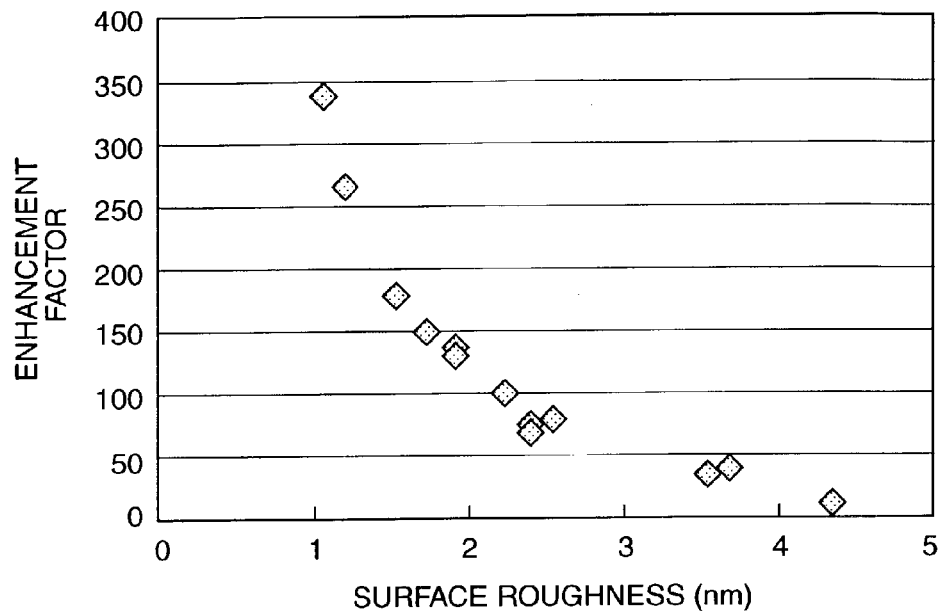
FIG. 8 is a graph showing the relationship between a surface roughness and enhancement factor.

FIG. 8 shows a correlation of the surface roughness with the enhancement factor of light transmission efficiency. The surface roughness (averages) of the samples are indicated by the horizontal axis and the enhancement factor are indicated by the vertical axis. There is a clear correlation between the enhancement factor of the light transmission efficiency and the surface roughness of the surface part other than the periodic surface specific shapes. As the surface roughness is reduced, the enhancement factor of the light transmission efficiency is significantly increased.

The reason is described below. The surface plasmon transmitted on the surface of the conductive film is usually scattered by the random surface roughness other than the periodic surface specific shapes, and the loss of the light power is caused. But in the present invention the loss of the light power can be reduced by improving the surface roughness.

There will be described an embodiment of an optical head which uses the optical device of the present invention to be lifted from a rotating optical recording medium for writing and reading information at high density.

The term "optical recording medium" used in the description of this embodiment means an arbitrary medium which uses a light to write and/or read data. And it includes a phase change medium for use in an optical medium of other types such as an optical disc (a DVD, a CD-ROM) or an optical tape or an optical magnetic material, but is not limited to the phase change medium (In the case of the optical magnetic material, only writing is performed optically and reading is performed magnetically.).

The term "optical head" used in the description of this embodiment means a device storing ("writing") data on an optical recording medium and/or taking out ("reading") data stored on the optical recording medium. The optical head of the present invention can perform reading, writing or both.

The optical head is formed with a slider shape for lifting the head from the surface of the optical recording medium to a predetermined height by rotation of the optical recording medium, wherein the waveguide means is an optical fiber, the focusing means has a lens collimating an emitted light of the optical fiber; a right angle prism deflecting an optical axis of the collimated light at a right angle; and a lens focusing the collimated light onto the optical device, the second surface of the conductive film is almost same plane with the lifted surface of the slider shape. The hole of the optical device is disposed approximately to the optical recording medium. It can be provided a high data density and a high-speed read/write speed, and it is possible to obtain a read/write head using a near field optical system such that data can be written and read on an optical recording medium such as a phase change medium without being susceptible to server attention.

Another head has a photo-detecting device photo-detecting a reflected light from the optical recording medium near the hole of the optical device, wherein the hole of the optical device is disposed proximately to the optical recording medium.

Figure 9:
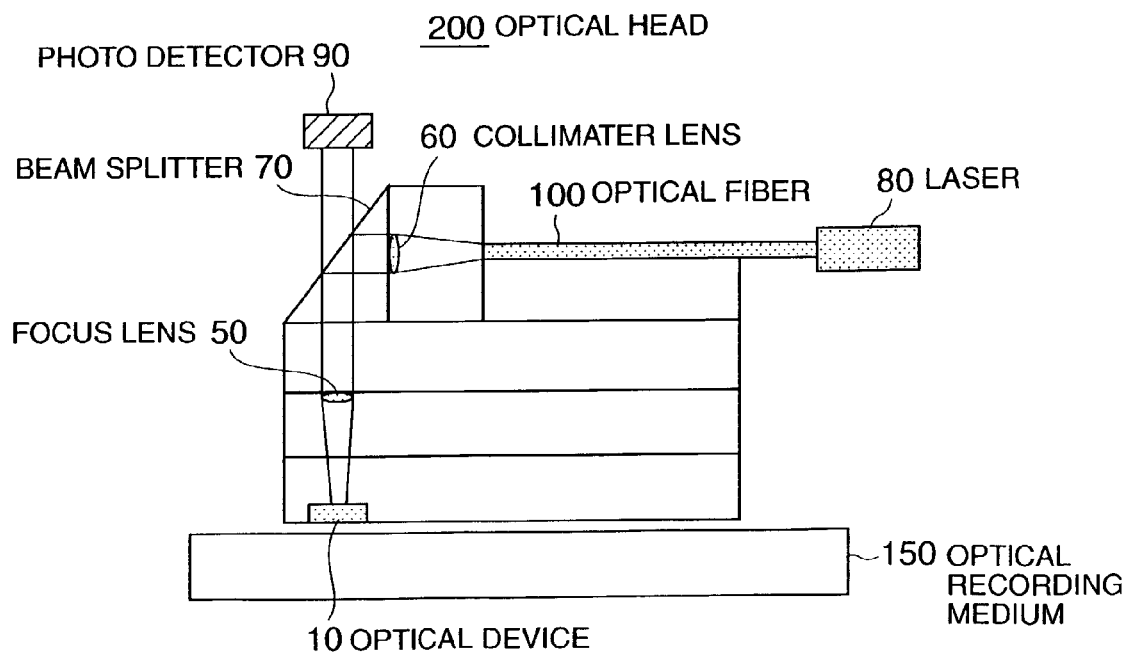
FIG. 9 is a diagram of the optical head using an optical device of the present invention.

FIG. 9 shows a schematic diagram of an optical head manufactured using the optical device of the present invention. An optical head 200 is formed on a slider shape for lifting the optical head to a predetermined height by rotation of an optical recording medium 150. A laser light emitted from a laser 80 is admitted via an optical fiber 100 and is collimated by arranging a collimator lens 60 of a micro lens. The collimated light changes the optical path by a beam splitter 70 in the right angle direction. It is guided to the optical device 10 according to the present invention by a focus lens 50 placed thereunder. The hole of the optical device is disposed approximately to the optical recording medium. It can be provided a high data density and a high-speed read/write speed.

The irradiation range of the light centering on the hole on the optical device is a region for three to ten periods in the periodic surface specific shapes, which is desirably designed in consideration of the light utilization efficiency. The hole diameter of the optical device is 20 to 200 nm.

To read information written on the optical recording medium, in the optical head of FIG. 9, a photo detector 90 is formed near the hole of the second surface of the optical device 10 to read a reflected light from the medium.

Using a magneto optical recording medium as the optical recording medium 150, the leakage flux from the medium can be read by a head using a magneto-resistance effect.

The optical head forms a recording pattern of almost the same size as the hole diameter on the optical recording medium. Reading can obtain a read waveform having a good SN ratio in the light reflection or magnetic read.

Using the optical device of the present invention, a condenser and a scanning near field microscope device can be constructed.

In the above embodiment, the optical device having one hole is explained since it is used for write/read to the optical disc. When a plurality of holes are periodically arrayed, other optical parts such as a wavelength selection optical filter (particularly, for a ultraviolet light, visible light and near-infrared wavelength) and a photolithography mask can be constructed.

What is claimed is:

1. An optical device including
   conductive films having first and second surfaces,
   at least one hole perforated from said first surface to said second surface, and surface specific shapes periodically provided on at least one of said first and second surfaces in which a light incident upon said one surface enhances an intensity transmitted through said hole,
   wherein
   said conductive films are multilayered structure having intermediate layer between said first and second surfaces, and
   said intermediate layer is of a semiconductor material having at least one layer.

2. An optical device according to claim 1, wherein said light incident upon said one surface interacts with a surface plasmon mode on at least one of the surfaces of said conductive films to enhance light transmission through said hole.

3. An optical device according to claim 1, wherein a surface roughness of a surface part other than said surface specific shapes is below about 1/10 of the wavelength of said incident light.

4. An optical device according to claim 1, wherein the surface roughness of a surface part other than said surface specific shapes is below about 1/300 of the wavelength of said incident light.

5. The optical device according to claim 1, wherein said semiconductor material is any one of Ge and Si.

6. The optical device according to claims 1, wherein the diameter of said hole is smaller than the wavelength of said incident light.

7. The optical device according to claim 6, wherein a layer having said first surface of said conductive film of a multilayered structure and a layer having said second surface thereof are of metal.

8. The optical device according to claim 7, wherein a layer having said first surface of said conductive film and a layer having said second surface thereof have a thickness larger than a skin depth of said incident light to said layers.

9. The optical device according to claim 8, wherein said conductive films are fixed on a substrate.

10. The optical device according to claim 9, wherein a value obtained by multiplying a period of said surface specific shapes by a refraction factor of a medium adjacent to said conductive films is smaller than the wavelength of a light transmitted through said conductive films.

11. The optical device according to claim 10, wherein said hole is circular or a slit shape or rectangular.

12. A head for an optical recording medium which at least writes information on an optical recording medium by a light from a light source, comprising:
    said optical device according to claim 1;
    waveguide means guiding a light from said light source; and
    means focusing the light of said waveguide means onto said optical device,
    wherein the hole of said optical device is disposed proximately to said optical recording medium.

13. A head for an optical recording medium which writes and reads information on an optical recording medium by a light from a light source, comprising:
    said optical device according to claim 1;
    waveguide means guiding a light of said light source;
    means focusing the light of said waveguide means onto said optical device; and
    a photo-detecting device photo-detecting a reflected light from said optical recording medium,
    wherein the hole of said optical device is disposed proximately to said optical recording medium.

14. The optical device according to claim 1, wherein a surface roughness of a surface part of the at least one of said first and second layer other than said surface specific shapes is below 4.3 nm.

15. An optical device including
    conductive films having first and second surfaces,
    at least one hole perforated from said first surface to said second surface, and surface specific shapes periodically provided on at least one of said first and second surfaces in which a light incident upon said one surface enhances an intensity transmitted through said hole,
    wherein
    said conductive films are multilayered structure having intermediate layer between said first and second surfaces, and
    a surface specific shapes formed on said first surface and a surface specific shapes formed on said second surface are different.

16. An optical device including
    a conductive films having first and second surfaces,
    at least one hole perforated from said first surface to said second surface, and surface specific shapes periodically provided on at least one of said first and second surfaces in which a light incident upon said one surface enhances an intensity transmitted through said hole,
    wherein
    said conductive films is a multilayered structure having an intermediate layer between said first and second surfaces, and
    said intermediate layer is a layer for reducing a surface roughness of a surface part of the at least one of said first and second surfaces other than said surface specific shapes.

17. The optical device according to claims 16, wherein said intermediate layer is of a conductive material having at least one layer.

18. The optical device according to claim 17, wherein said conductive material is any one of a CoZr alloy, Ta, Cr, Ti, Zr, Nb and C.

19. The optical device according to claim 16, wherein said intermediate layer is of an insulating material having at least one layer.

20. The optical device according to claim 19, wherein said insulating material is any one of Si3N4, SiO2, Al2O3, Ta2O5, NiO, TiO2, ZrO2 and NbO3.

* * * * *